United States Patent
Espie et al.

(10) Patent No.: US 10,620,438 B2
(45) Date of Patent: Apr. 14, 2020

(54) HEAD-BORNE VIEWING SYSTEM COMPRISING CROSSED OPTICS

(71) Applicant: THALES, Courbevoie (FR)

(72) Inventors: Jean-Luc Espie, Mornant (FR); Frédéric Diaz, Saint Heand (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/524,231

(22) PCT Filed: Nov. 3, 2015

(86) PCT No.: PCT/EP2015/075624
§ 371 (c)(1),
(2) Date: May 3, 2017

(87) PCT Pub. No.: WO2016/071352
PCT Pub. Date: May 12, 2016

(65) Prior Publication Data
US 2017/0343818 A1    Nov. 30, 2017

(30) Foreign Application Priority Data

Nov. 6, 2014  (FR) ...................................... 14 02510

(51) Int. Cl.
*G02B 27/14* (2006.01)
*G02B 27/01* (2006.01)
(52) U.S. Cl.
CPC .. *G02B 27/0172* (2013.01); *G02B 2027/0132* (2013.01)

(58) Field of Classification Search
CPC ........ G02B 27/0172; G02B 2027/0107; G02B 2027/0109; G02B 2027/011;
(Continued)

(56) References Cited

U.S. PATENT DOCUMENTS 5,124,821 A * 6/1992 Antier ................ G02B 27/0103
345/8
5,341,242 A 8/1994 Gilboa et al.
(Continued)

FOREIGN PATENT DOCUMENTS

CN         101915992 A    12/2010
FR         2 593 932 A1    8/1987
(Continued)

*Primary Examiner* — Brandi N Thomas
(74) *Attorney, Agent, or Firm* — Baker & Hostetler LLP

(57) ABSTRACT

Monocular or binocular viewing systems worn on the head of a user are provided. Each monocular assembly comprises a display and an optical assembly including an optical relay and a partially transparent optical combiner taking the form of an inclined curved plate, each optical assembly arranged to form a second image at infinity from a first image displayed by a display. The optics are to be crossed such that, in the case of a binocular system, if one optical combiner is placed in front of the right eye of the user, the optical relay and the corresponding display are placed in a forehead-facing position above the left eye of the user and under the optical combiner located on the left-hand side. This arrangement is obtained by judiciously choosing the geometric parameters of the various optical elements, their curvatures and the form of their surfaces.

7 Claims, 3 Drawing Sheets

(58) Field of Classification Search
CPC .... G02B 2027/0116; G02B 2027/0123; G02B 2027/0132; G02B 2027/0145; G02B 2027/015; G02B 2027/0161; G02B 27/0101; G02B 27/0103; G02B 5/04; G02B 5/28; G02B 5/32
USPC .................................................. 359/619–633
See application file for complete search history.

(56) References Cited

U.S. PATENT DOCUMENTS

| 5,684,634 A | * | 11/1997 | Rogers | ............... | G02B 27/0101 |
| | | | | | 359/630 |
| 2006/0119951 A1 | * | 6/2006 | McGuire, Jr. | ...... | G02B 27/0081 |
| | | | | | 359/630 |

FOREIGN PATENT DOCUMENTS

| JP | 4-501927 A | 4/1992 |
| JP | 8-262366 A | 10/1996 |
| JP | 9-65247 A | 3/1997 |
| WO | 91/04508 A2 | 4/1991 |
| WO | 94/11773 A1 | 5/1994 |
| WO | 2009/136393 A1 | 11/2009 |
| WO | 2010/089495 A2 | 8/2010 |
| WO | 2013/036888 A2 | 3/2013 |

* cited by examiner

HEAD-BORNE VIEWING SYSTEM COMPRISING CROSSED OPTICS

CROSS-REFERENCE TO RELATED APPLICATIONS

This application is a National Stage of International patent application PCT/EP2015/075624, filed on Nov. 3, 2015, which claims priority to foreign French patent application No. FR 1402510, filed on Nov. 6, 2014, the disclosures of which are incorporated by reference in their entirety.

FIELD OF THE INVENTION

The field of the invention is that of helmet-mounted viewing systems. These systems are also known as "HMD see-through systems", HMD being the acronym for "head-mounted display". They are intended for various applications. By way of example, they may be worn by aircraft pilots or infantrymen.

BACKGROUND

These systems are intended to project toward the eye of the user an aerial image collimated to infinity and superposed on the exterior landscape. The projected image may include a symbology representative of information on tasks, the mission to be accomplished or the exterior environment and/or even the image given by a video camera. The latter may be a low-light video camera or an infrared video camera or a thermal video camera.

The systems are either monocular or binocular depending on whether the user perceives the image with one eye or with both eyes.

These systems generally include a small high-resolution display on which the image to be projected is displayed, an optical relay and an optical combiner or "mixer" that ensures both the reflection of the image projected and collimated on the eye of the user and the transmission of the exterior landscape. This mixer is integrated into a screen or visor or a pair of glasses. By visor or screen, what is meant is a transparent curved element placed in front of the eyes of the user and the first function of which is to protect the eyes of the user while ensuring he has a good visibility of the exterior. This protection is mechanical but may also be optical if the visor includes particular treatments. In the rest of the text, the terms "screen" and "visor" will be used interchangeably to designate the support of the mixer.

In most applications, the visual field of the viewing system must be large, i.e. comprised between 20 degrees and 40 degrees. However, in most of the proposed solutions, the mixer is an optical element with a significant off-axis so as to ensure a good transmission and to leave the fewest possible optical elements in the field of view. Constructing a good-quality optical solution with a substantial off-axis is a first difficulty.

A second difficulty with this type of viewing system is that the integration of the mixer into the screen must disrupt as little as possible the vision of the exterior, human vision being naturally large-field. Thus, the human field of view reaches 200 degrees in a lateral plane and 125 degrees in a vertical plane. The mixer must therefore introduce the fewest possible visual obstructions and must have a shape that follows as closely as possible the contours of the face. It is also necessary for the system to be compatible with the wearing of with prescription eyeglasses.

Lastly, the weight and bulk of the system must remain small in order to allow it to be easily integrated under the forehead-facing portion of a helmet or to allow it to be placed directly on the face in the form of a pair of goggles, for example ski goggles or protective goggles, or even using a suitable skull cap or headband.

Mass-market viewing systems mounted on spectacle temples do not meet all these conditions.

Various technical solutions have been proposed. A first type of solution consists in placing the entire system laterally, the entire system then being contained in an essentially horizontal plane. The display and the optical relay are located on one of the lateral sides of the head of the user. By way of example, mention may be made of the devices described in patent applications WO 2010/089495 (entitled "Portable augmented-reality head-up display device") and WO 2009/136393 (entitled "Wide angle helmet mounted display system"). These solutions have the drawbacks of being complex, bulky and of forming a lateral obstruction that may be significant.

A second type of solution consists in placing the entire system facing the forehead, the entire system being contained in a substantially vertical plane above the eye of the observer. By way of example, mention may be made of the devices described in patent applications WO 2013/036888 (entitled "Night vision devices and methods") and U.S. Pat. No. 5,341,242 (entitled "Helmet mounted display"). As may be seen from the various figures of these patent applications, the optical solutions provided are complex. Their integration into the forehead-facing portion of a helmet is not simple. Moreover, they are essentially monocular solutions and the conversion of these solutions to binocular versions is problematic.

The head-borne viewing system according to the invention does not have these drawbacks. It may be monocular or binocular. It includes what are called crossed optics. By this what is meant, in the case of a binocular system, is that if one optical combiner is placed in front of the right eye of the user, the optical relay and the corresponding display are placed in a forehead-facing position above the left eye of the user and under the optical combiner located on the left-hand side. This arrangement is obtained by judiciously choosing the geometric parameters of the various optical elements, their curvatures and the form of their surfaces. This optical architecture has many advantages both as regards simplicity of construction and as regards bulk, and is easily accommodated under the forehead-facing portion of a helmet.

SUMMARY OF THE INVENTION

More precisely, the subject of the invention is a viewing system including a first display and a first optical assembly including a first optical relay and a semi-transparent first optical combiner, the first optical assembly being arranged to form a second image at infinity of a first image displayed by the first display, the viewing system being intended to be worn on the head of a user, the first optical combiner being placed in front of one of the two eyes of said user under the conditions of use, the exit optical pupil of the first assembly being placed level with said eye, the optical axis of the first optical assembly corresponding to the light ray of the central field of view passing through the center of the optical pupil, characterized in that:

the first optical combiner is a thin plate having substantially parallel curved faces, each face being defined by a polynomial relationship or a file of points defining a free surface;

the inclination of the first optical combiner to the optical axis is substantially equal to 35 degrees;

the distance separating the exit pupil from the point of intersection between the optical axis and the first optical combiner is about 60 millimeters; and the optical combiner has an almost zero optical power in transmission in order not to deform direct vision.

In the position of use, the inclination of the mean optical axis of the first optical combiner and of the first frontal lens, in a vertical plane and with respect to a straight line joining the centers of the two eyes, is about 25 degrees, so that the first optical relay is located level with the forehead and above the other eye of the user, in crossed position with the first optical combiner.

Advantageously, the first optical relay including a first frontal lens, the first surface of said first frontal lens located closest to the mixer is defined by a polynomial relationship or a file of points defining a free-form.

Advantageously, the second surface of the first frontal lens is aspherical or is defined by a polynomial relationship or a file of points defining a free-form.

Advantageously, the first display being a liquid-crystal display (LCD) or an emissive display or an organic light-emitting diode (OLED) display, the first optical relay only includes, in order from the first optical combiner to the first display: the first frontal lens, a doublet of convergent-divergent lenses with spherical surfaces, and an eccentric biconvex lens with spherical surfaces.

Advantageously, the first display being reflective and being a liquid-crystal-on-silicon (LCOS) display and the system including a light source, the first optical relay is telecentric and includes only, in order from the first optical combiner to the first display: the first frontal lens, a doublet of convergent-divergent lenses with spherical surfaces, an eccentric converging meniscus lens with spherical surfaces, a beam-splitter cube able to reflect the light emitted by the light source toward the first display, and an eccentric biconvex lens with spherical surfaces.

Advantageously, the beam-splitter cube is a PBS cube, the acronym PBS standing for "polarizing beam-splitter".

Advantageously, in its binocular variant, the system includes a second display and a second optical assembly including a second optical relay and a semi-transparent second optical combiner, the second display being identical to the first display and the second optical assembly being identical to the first optical assembly, the second display and the second optical assembly being placed symmetrically with respect to the first display and to the first optical assembly, so that the second optical combiner is placed in front of the other eye of the user, the first optical relay being placed above the second optical combiner and the second optical relay being placed above the first optical combiner, the plane of symmetry being the median plane of the head.

The "mixers" have a form and orientation that are oriented in a general direction corresponding to the general curvature of the face, and that allow the left and right screens to be extended beyond the "useful" semi-reflective zones and thus a single-piece screen that has a role protecting the face and in particular the eyes to be formed. Thus, the screen's continuous generally convex form, the curvature of which corresponds to that of the face, makes it possible to preserve direct and unaltered vision through the screen.

BRIEF DESCRIPTION OF THE DRAWINGS

The invention will be better understood and other advantages will become apparent on reading the following non-limiting description, which is given with reference to the appended figures, in which.

DETAILED DESCRIPTION

Figure 1:
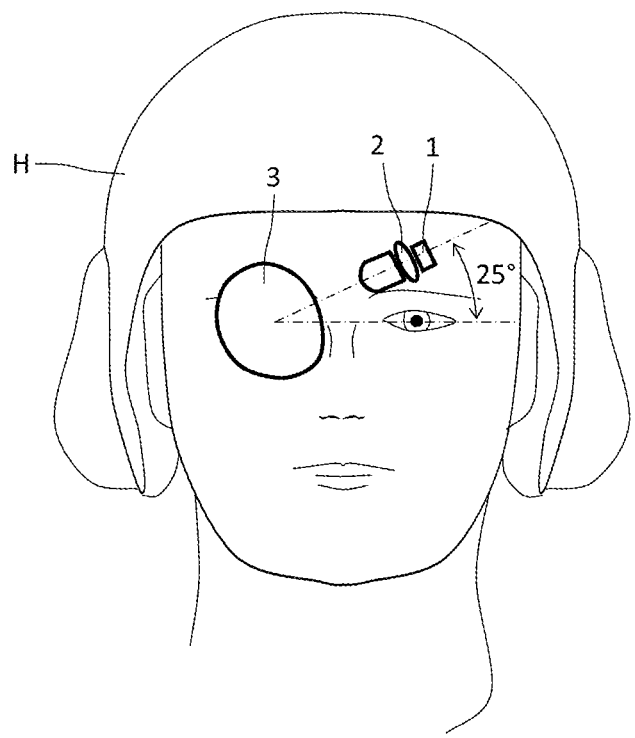
FIG. 1 shows a front view of a first monocular viewing system according to the invention.

A viewing system according to the invention is intended to be borne by the head of a user. The mechanical support of the head-borne viewing system may be a helmet, a pair of glasses or any other head-borne support.

The viewing system has a monocular version and a binocular version. Each monocular unit includes:

a display, and an optical assembly including a refractive optical relay and a partially transparent, and typically semi-transparent, optical mixer or combiner integrated into a screen, into a helmet visor or into a pair of glasses, and operating by reflection. The optical combiner is a thin plate having curved faces that are substantially parallel to each other, and that creates little or no distortion of the exterior landscape. This combiner has no optical power in transmission.

In the rest of the description, the virtual axis corresponding to the light ray of the central field of view passing through the center of the optical pupil is called the optical axis.

A monocular unit operates in the following way. The optical assembly is arranged to form a second image that is collimated or at "optical infinity" of a first image displayed by the display, the exit optical pupil of the optical assembly being placed level with the eye of the observer. The optical pupil is larger than the diameter of the eye's pupil so as to afford a certain amount of user comfort and to make it possible to accommodate for variations in inter-pupillary distance. This image is perceived by the user in superposition on the exterior landscape transmitted by the optical combiner.

In order that the general placement of a viewing system according to the invention on a support be as ergonomic as possible and as simple as possible to achieve, the optics are what are called crossed optics. By this what is meant, in the case of a binocular system, is that if one optical combiner is placed in front of the right eye of the user, the optical relay and the corresponding display are placed in a forehead-facing position above the left eye of the user and under the optical combiner located on the left-hand side.

In order for this placement to be possible, it is necessary for:

The inclination of the first optical combiner to the optical axis to be substantially equal to 35 degrees, i.e. for the reflected optical axis to make an angle of about 70 degrees to the incident optical axis. A smaller angle requires a larger distance between the eye and the mixer, implying optics of larger sizes. A larger angle requires more substantial optical corrections, which are difficult to reproduce. It is preferable for this angle of inclination to be comprised between 33 degrees and 37 degrees. It is essential for the optical combiner to be a non-axisymmetric surface defined by a polynomial relationship or what is called a "free-form" surface defined by a file of points. Specifically, a spherical mixer introduces geometric aberrations that are too large to be able to be corrected with a simple optical relay;

The distance separating the exit pupil from the point of intersection between the optical axis and the first optical combiner is about 60 millimeters. This distance is necessary so that, in the case of a binocular application, the optical relay of the first optical system can be accommodated between the forehead and the mixer of the second optical system. It also allows the user to wear prescription eyeglasses;

In the position of use, the inclination of the mean optical axis of the first optical mixer and of the first frontal lens of the optical relay, in a vertical plane and with respect to a straight line joining the centers of the two eyes, is about 25 degrees, so that the first optical relay is located level with the forehead and above the other eye of the user, in crossed position with the first optical mixer. A smaller angle leads to the optical relay being too low down on the other eye and introduces visual obstructions. A large angle leads to the optical relay being too high up and it can then no longer be positioned under the forehead-facing portion of the helmet. It is preferable for this angle of inclination to be comprised between 20 degrees and 30 degrees. It is important for the first surface of the first frontal lens located closest to the mixer to be non-axisymmetric i.e. for it to be defined by a polynomial relationship or to be a "free-form" surface defined by a file of points, so as to decrease the residual geometric aberrations of the mixer.

Highly eccentric optical components such as the mixer according to the invention generate very large geometric aberrations if they are simple inclined spherical mirrors. As was mentioned above, it is essential for the surface of the optical combiner to be a non-axisymmetric or "free-form" surface, i.e. for the curvature of its surface to be defined by a polynomial relationship or by a file of points, in order to best compensate for eccentricity aberrations.

However, this correction is not enough to completely correct the geometric aberrations of the mixer. The optical relay must therefore compensate for residual aberrations. The optical relay includes a first frontal lens located as close as possible to the mixer, the first surface of which is also defined by a polynomial relationship. Thus the aberrations of the mixer are corrected "as close as possible" thereto. So as to prevent the multiplication of aspherical lenses or lenses with one or more "free-form" surfaces, recourse is also made, to best correct the residual aberrations, to eccentric or tilted spherical lenses. It will be noted that the aberation distortion is not corrected by the optics. This correction is made directly to the image generated by the display, by image processing based on the laws of optical distortion. The generated image contains an inverse distortion that exactly compensates for the distortion of the optical assembly.

The precise arrangement and the optimization of the optical components is obtained by means of optical software, well known to those skilled in the art.

Figure 2:
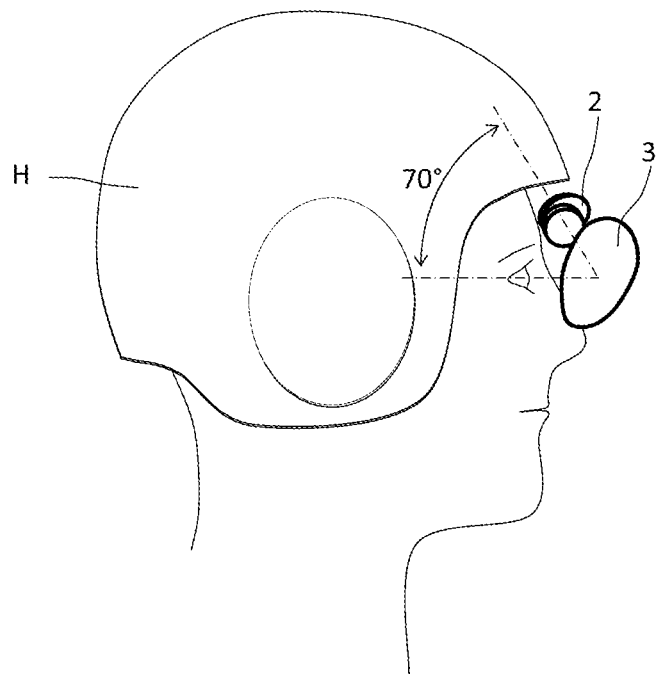
FIG. 2 shows a profile view of the preceding monocular viewing system.
Figure 3:
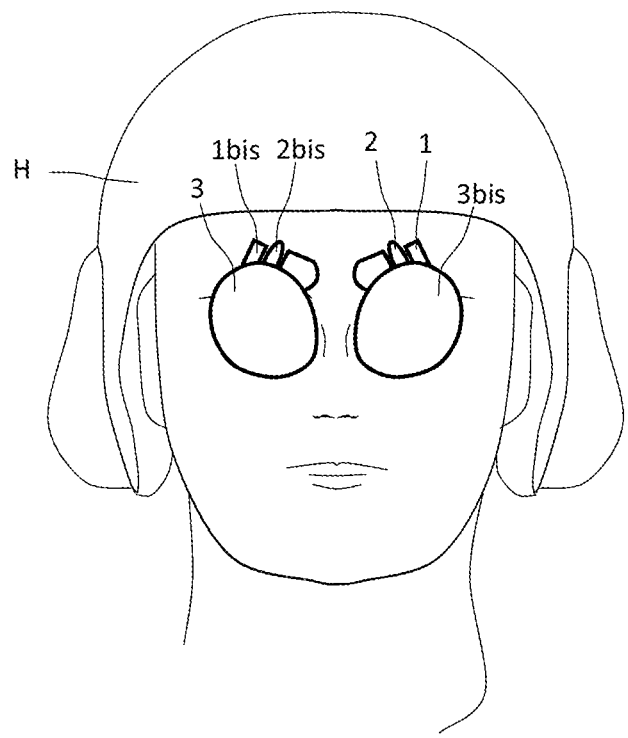
FIG. 3 shows a front view of the binocular version of the preceding viewing system.

A first placement of a system according to the invention on a helmet H is shown in FIGS. 1, 2 and 3. In these various figures, the screen or visor of the helmet has not been shown. FIG. 1 shows a front view and FIG. 2 a profile view of a monocular system. In these two figures, the display 1 and the optical relay 2 are on the left-hand side of the helmet and the mixer 3 transmits an image to the right eye of the user.

As shown in FIG. 3, the binocular system includes two identical assemblies that are symmetrical to each other with respect to a vertical plane. Thus, the second assembly includes a display 1*bis*, an optical relay 2*bis* and a mixer 3*bis*.

This first placement operates with an emissive or transmissive display. This display may be passive. It may be a question of a liquid crystal display (LCD). It may also be an active organic light-emitting diode (OLED) display.

Figure 4:
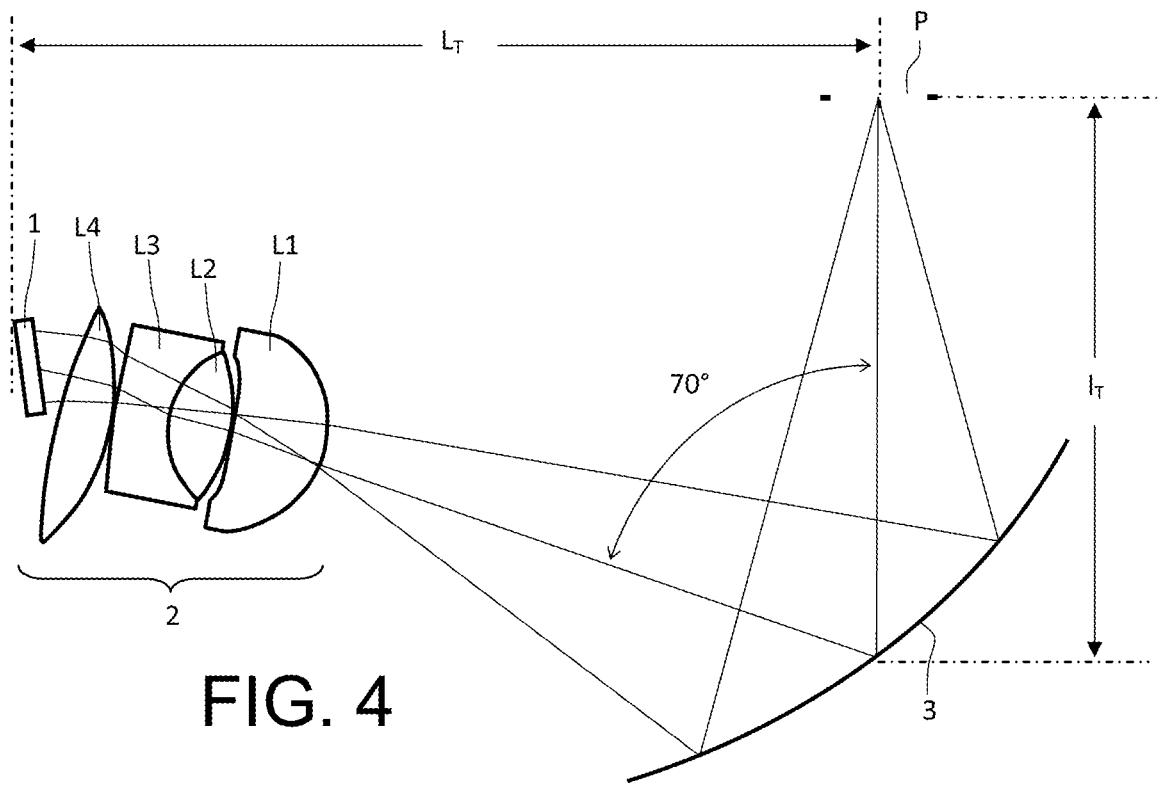
FIG. 4 shows a cross-sectional view of the first monocular viewing system.

A cross-sectional view of the complete optical architecture of a monocular assembly including such a display is shown in FIG. 4. This example is nonlimiting. It includes a display 1, an optical relay including four lenses L1, L2, L3 and L4 and a mixer 3 forming a collimated image level with the pupil P. In this figure and in FIG. 6, the outlines of the components are shown in bold lines. Thin lines also show three light rays. They represent the mean rays passing through the center of the pupil corresponding to the central field that the optical axis follows and to two extreme fields.

The following are the general characteristics of this monocular assembly:

Type of display: LCD or OLED of 8 mm×5 mm
Visual field: 32 degrees horizontal×18 degrees vertical
Pupil size: 10 mm×10 mm
Bulk: Length $L_T$: 86 mm and width $I_T$: 54 mm Characteristics of the mixer:

Thin plate that has been treated to be semi-reflective and that has curved faces that are parallel to each other
Average radius of curvature: 48 mm
Polynomial-type surface
Angle of tilt: 36 degrees Characteristics of the four lenses of the optical relay. The lens L1 is the closest to the mixer and the lens L4 the closest to the display.

Lens L1 (centered)
Material: PMMA plastic
First surface: polynomial-type surface of 10 mm average radius of curvature-Second surface: aspherical surface of 2000 mm average radius of curvature
Central thickness: 10 mm Doublet L2-L3 (centered)
Materials: glasses
First surface: spherical of 14 mm radius of curvature—Second surface: spherical of 8 mm radius of curvature-Third surface: spherical of 90 mm radius of curvature
First central thickness: 6 mm-Second central thickness: 6 mm Lens L4 (eccentric and tilted)
Material: glass
First surface: spherical of 20 mm radius of curvature—Second surface: spherical of 55 mm radius of curvature
Central thickness: 5 mm It is also possible to use a viewing system according to the invention with a reflective display. For example, this display may be a liquid-crystal-on-silicon (LCOS) display. One of the difficulties is that, by nature, the illumination must pass through the optical relay. To this end, a beam-splitter cube is introduced into the very interior of the optical relay which ensures both the illumination of the display and the transmission of the light reflected thereby. Generally, this cube is a polarizing beam-splitter (PBS) cube. Optically, this cube corresponds to the addition of a thick glass plate having planar and parallel faces. In addition, the optical relay must be telecentric so as to ensure a uniform illumination. By telecentric what is meant is a lens the pupil of which in the space of the display is at infinity.

Figure 5:
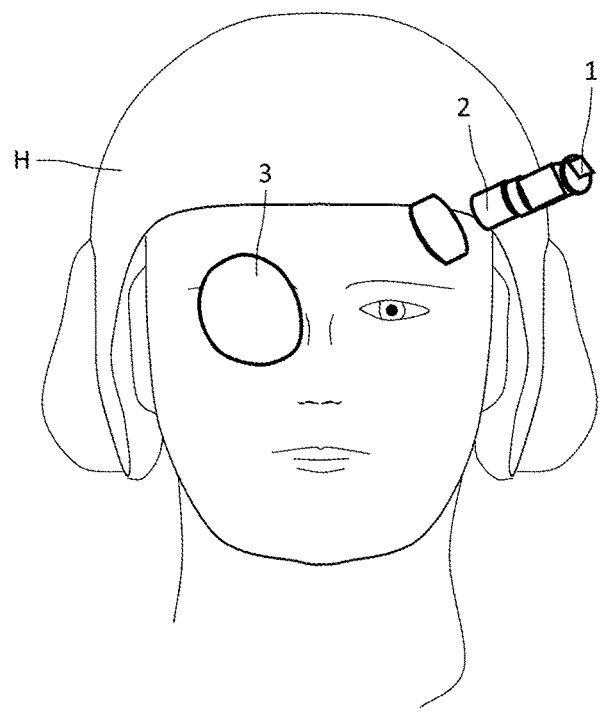
FIG. 5 shows a front view of a second monocular viewing system according to the invention.

FIG. 5 shows a front view of a monocular viewing system with an LCOS display. As may be seen in this figure, constraints on the placement of the beam-splitter cube lead to a more complex and clearly more bulky optical solution.

Figure 6:
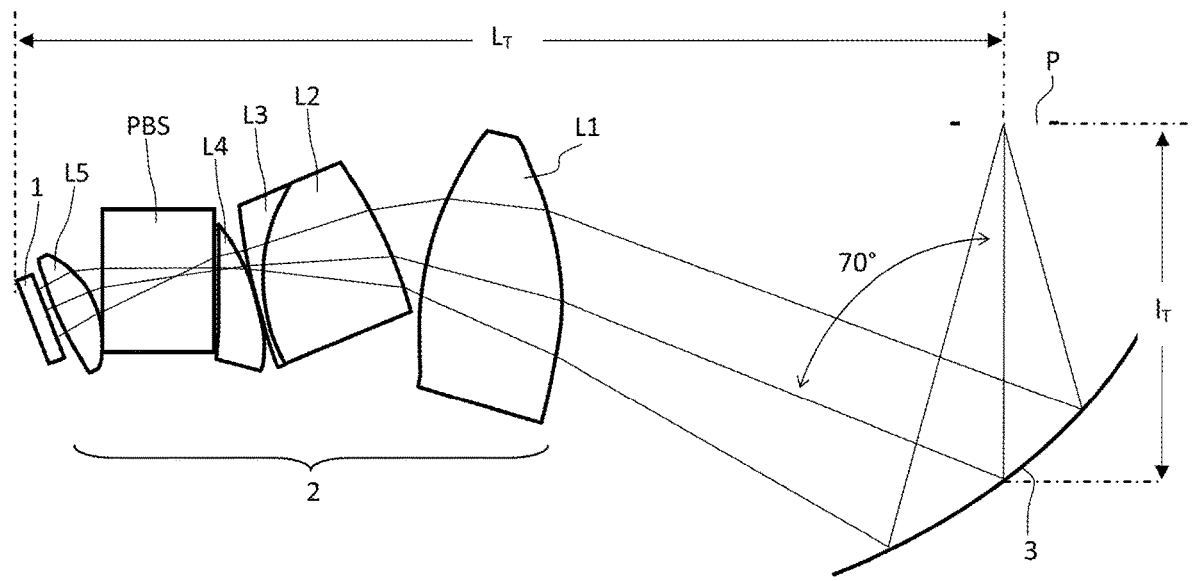
FIG. 6 shows a cross-sectional view of the second monocular viewing system.

A cross-sectional view of the complete optical architecture of a monocular assembly including such an LCOS display is shown in FIG. 6. It includes a display 1, an optical relay including five lenses L1, L2, L3, L4, L5 and a beam-splitter cube and a mixer 3 forming a collimated image level with the pupil P.

The following are the general characteristics of this monocular assembly:
  Type of display: LCOS of 12 mm×9 mm
  Visual field: 32 degrees horizontal×18 degrees vertical
  Pupil size: 15 mm×10 mm
  Bulk: Length $L_T$: 162 mm and width $I_T$: 60 mm
Characteristics of the mixer:
  Thin plate that has been treated to be semi-reflective and that has curved faces that are parallel to each other
  Average radius of curvature: 70 mm
  Polynomial-type surface
  Angle of tilt: 35 degrees
Characteristics of the five lenses and of the beam-splitter cube of the optical relay. The lens L1 is the closest to the mixer and the lens L5 the closest to the display.
  Lens L1 (centered)
    Material: PMMA plastic
    First surface: polynomial-type surface of 42 mm average radius of curvature-Second surface: aspherical surface of 43 mm average radius of curvature
    Central thickness: 26 mm
  Doublet L2-L3 (eccentric)
    Materials: glasses
    First surface: spherical of 74 mm radius of curvature-Second surface: spherical of 28 mm radius of curvature-Third surface: spherical of 88 mm radius of curvature
    First central thickness: 26 mm-Second central thickness: 1 mm
  Meniscus lens L4 (eccentric and convergent)
    Material: glass
    First surface: spherical of 38 mm radius of curvature-Second surface: spherical of 160 mm radius of curvature
    Central thickness: 10 mm
  Beam-splitter cube
    Material: glass
    Thickness: 21 mm
  Lens L5
    Material: glass
    First surface: spherical of 16 mm radius of curvature—Second surface: spherical of 65 mm radius of curvature
    Central thickness: 7 mm

The invention claimed is:

1. A viewing system including a first display and a first optical assembly including a first optical relay and a partially transparent first optical combiner, said first optical relay comprising only dioptric optical components operating by transmission, the first optical relay including a first frontal lens, the first optical assembly being arranged to form a second image at infinity of a first image displayed by the first display, the viewing system being intended to be worn on the head of a user, the first optical combiner being placed in front of one of the two eyes of said user under the conditions of use, the exit optical pupil of the first assembly being placed level with said eye, the optical axis of the first optical assembly corresponding to the light ray of the central field of view passing through the center of the optical pupil, wherein:
  the first optical combiner is a thin plate having substantially parallel curved faces, each face being defined by a polynomial relationship or a file of points defining a free-form;
  the inclination of the first optical combiner to the optical axis is about 35 degrees;
  the distance separating the exit pupil from the point of intersection between the optical axis and the first optical combiner is about 60 millimeters; and
  in the position of use, the inclination of the mean optical axis of the first optical combiner and of the first frontal lens, in a vertical plane and with respect to a straight line joining the centers of the two eyes, is about 25 degrees, so that the first optical relay is located level with the forehead and above the other eye of the user, in crossed position with the first optical combiner.

2. The viewing system as claimed in claim 1, wherein the first optical relay including a first frontal lens, the first surface of said first frontal lens located closest to the combiner is defined by a polynomial relationship or a file of points defining a free-form.

3. The viewing system as claimed in claim 2, wherein the second surface of the first frontal lens is aspherical or is defined by a polynomial relationship or a file of points defining a free-form.

4. The viewing system as claimed in claim 1, wherein the first display being an LCD or OLED display, the first optical relay only includes, in order from the first optical combiner to the first display: the first frontal lens, a doublet of convergent-divergent lenses with spherical surfaces, and an eccentric biconvex lens with spherical surfaces.

5. The viewing system as claimed in claim 1, wherein the first display being an LCOS display and the system including a light source, the first optical relay is telecentric and includes only, in order from the first optical combiner to the first display: the first frontal lens, a doublet of convergent-divergent lenses with spherical surfaces, an eccentric converging meniscus lens with spherical surfaces, a beam-splitter cube able to reflect the light emitted by the light source toward the first display, and an eccentric biconvex lens with spherical surfaces.

6. The viewing system as claimed in claim 5, wherein the beam-splitter cube is a PBS cube.

7. The viewing system as claimed in claim 1, wherein the system being binocular, it includes a second display and a second optical assembly including a second optical relay and a partially transparent second optical combiner, the second display being identical to the first display and the second optical assembly being identical to the first optical assembly, the second display and the second optical assembly being placed symmetrically with respect to the first display and to the first optical assembly, so that the second optical combiner is placed in front of the other eye of the user, the first optical relay being placed above the second optical combiner and the second optical relay being placed above the first optical combiner, the plane of symmetry being the median plane of the head.

* * * * *